United States Patent
Rockwell et al.

(10) Patent No.: US 9,677,494 B2
(45) Date of Patent: Jun. 13, 2017

(54) METHOD FOR MITIGATING CAVITATION

(71) Applicant: Ford Global Technologies, LLC, Dearborn, MI (US)

(72) Inventors: Mark Anthony Rockwell, Wyandotte, MI (US); Jonathan Andrew Butcher, Farmington, MI (US); William David Treharne, Ypsilanti, MI (US); Matthew D. Smith, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 14/668,615

(22) Filed: Mar. 25, 2015

(65) Prior Publication Data

US 2016/0281630 A1    Sep. 29, 2016

(51) Int. Cl.
*F02D 41/22* (2006.01)
*F02D 41/30* (2006.01)
(Continued)

(52) U.S. Cl.
CPC ............ *F02D 41/30* (2013.01); *F01M 13/00* (2013.01); *F02D 19/0602* (2013.01); *F02D 41/0007* (2013.01); *F02D 41/062* (2013.01); *F02D 41/3082* (2013.01); *F02D 41/34* (2013.01); *F02M 25/08* (2013.01); *F02M 37/08* (2013.01); *F02N 11/0825* (2013.01); *F02D 41/0025* (2013.01); *F02D 41/182* (2013.01); *F02D 2200/0414* (2013.01); *F02D 2200/0602* (2013.01); *F02D 2200/0606* (2013.01); *F02D 2200/0611* (2013.01); *F02D 2200/0612* (2013.01); *F02D 2200/1002* (2013.01);
(Continued)

(58) Field of Classification Search
CPC ...... F02D 41/30; F02D 41/602; F02D 41/007; F02D 41/3082; F02D 41/34; F02D 41/0025; F02D 41/182; F02D 19/0602; F02D 2200/0612; F02D 2200/0414; F02D 2200/0606; F02D 2200/0611; F02D 2200/1002; F02D 2200/703; F02D 2200/0602; F02D 2250/02; F02D 2250/18; F02D 41/062; F02D 41/0007; F02N 11/0825; F02N 11/0822; F02N 2200/122; F02N 2200/101; F02N 2200/121
USPC ........ 123/446, 495, 497; 701/110, 103, 104, 701/105, 113; 73/114.38, 114.41, 114.42, 73/114.43
See application file for complete search history.

(56) References Cited

U.S. PATENT DOCUMENTS 6,330,525 B1    12/2001  Hays et al.
6,655,922 B1    12/2003  Flek
(Continued)

FOREIGN PATENT DOCUMENTS

EP    2202145 A1    6/2010

*Primary Examiner* — Hai Huynh
(74) *Attorney, Agent, or Firm* — David Kelley; McCoy Russell LLP (57) ABSTRACT

Methods and systems are provided for mitigating loss of engine torque due to cavitation in a fuel pump. One example approach is adjusting engine operation or fuel pump operation based on ambient conditions and a measured engine torque being lower than a desired engine torque after a pre-determined duration. The ambient conditions may include one or more of ambient temperature being higher than a temperature threshold, barometric pressure lower than a threshold pressure, and fuel volatility higher than a threshold volatility.

20 Claims, 4 Drawing Sheets

(51) Int. Cl.
    *F02D 19/06*     (2006.01)
    *F02D 41/06*     (2006.01)
    *F02D 41/34*     (2006.01)
    *F02D 41/00*     (2006.01)
    *F02M 37/08*     (2006.01)
    *F01M 13/00*     (2006.01)
    *F02M 25/08*     (2006.01)
    *F02D 41/18*     (2006.01)
    *F02N 11/08*     (2006.01)

(52) U.S. Cl.
    CPC .... *F02D 2200/703* (2013.01); *F02D 2250/02* (2013.01); *F02D 2250/18* (2013.01); *F02N 11/0822* (2013.01); *F02N 2200/101* (2013.01); *F02N 2200/121* (2013.01); *F02N 2200/122* (2013.01); *Y02T 10/40* (2013.01)

(56) References Cited

U.S. PATENT DOCUMENTS

| | | |
|---|---|---|
| 7,373,924 B1 | 5/2008 | Krengel et al. |
| 7,967,720 B2 | 6/2011 | Martin et al. |
| 8,499,734 B2 | 8/2013 | Wang et al. |
| 2010/0242901 A1 | 9/2010 | Seto et al. |
| 2011/0241888 A1 | 10/2011 | Lu et al. |
| 2014/0031170 A1 | 1/2014 | Cunningham et al. |

METHOD FOR MITIGATING CAVITATION

FIELD

The present application relates to methods for mitigating cavitation in a fuel pump delivering fuel to an internal combustion engine.

BACKGROUND AND SUMMARY

Delivery of fuel to an engine may be compromised due to cavitation in a fuel pump supplying fuel to the engine. Cavitation may occur by the formation of vapor bubbles in the fuel pump. Further, cavitation may be exacerbated by using fuels with higher volatility (e.g., a higher Reid Vapor Pressure), as well as due to higher ambient temperatures and/or lower atmospheric pressures. Engine operation may be adversely affected by cavitation and the engine may experience issues such as engine hesitation, an unexpected loss of torque, and potential engine stall. As such, hybrid vehicles and non-hybrid vehicles that are equipped with start-stop systems may experience frequent engine starts. A loss of torque following engine start in these vehicles may severely impact engine operation, drivability, and operator experience.

The inventors herein have recognized the above issues and identified approaches to at least partly address the issues. In one example approach, a method for an engine in a vehicle comprises following an engine start, adjusting engine operation or fuel pump operation responsive to detection of cavitation in a fuel pump, the detection of cavitation based on ambient conditions and a measured engine torque being lower than a desired engine torque after a first pre-determined duration.

For example, fuel may be supplied to an engine in a vehicle by a fuel system including a fuel pump and a fuel tank. The vehicle may be a hybrid vehicle or a vehicle including a start-stop system. Further, the fuel in the fuel tank may have a higher volatility and an ambient temperature may be sufficiently high to enhance vaporization of fuel in the tank. If, upon an engine start and following a first pre-determined duration, a measured engine torque is determined to be lower than a desired engine torque, a likelihood of cavitation in the fuel pump may be established. In response to the cavitation, various remedying actions may be undertaken including adjusting engine operation and/or modifying fuel pump operation. For example, modifying fuel pump operation may include one or more of activating and deactivating the fuel pump repeatedly for the second pre-determined duration, deactivating the fuel pump for a third pre-determined duration, and operating the fuel pump at a higher speed for a fourth pre-determined duration. Further, adjusting the engine operation may include commanding an engine restart and/or delaying engine start until the fuel pump is operated at a higher speed for the fourth pre-determined duration.

In this way, adverse effects of cavitation on engine operation may be alleviated. By identifying that a loss of engine torque following an engine start is due to cavitation, various actions specific to mitigating cavitation may be applied. Further, a likelihood of engine stalls may be reduced. Overall, engine performance may be enhanced and drivability may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
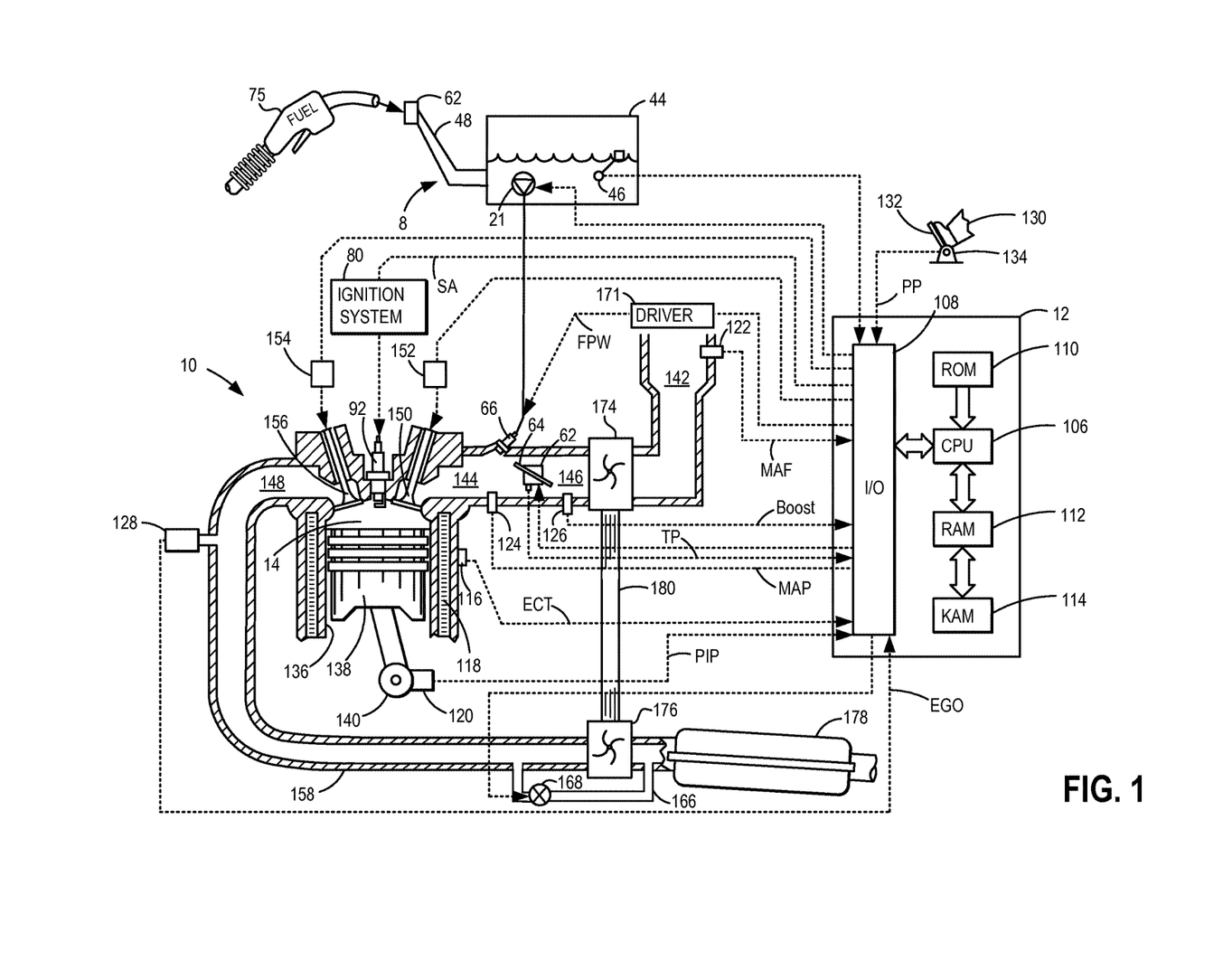
FIG. 1 portrays a schematic diagram of an engine.
Figure 3:
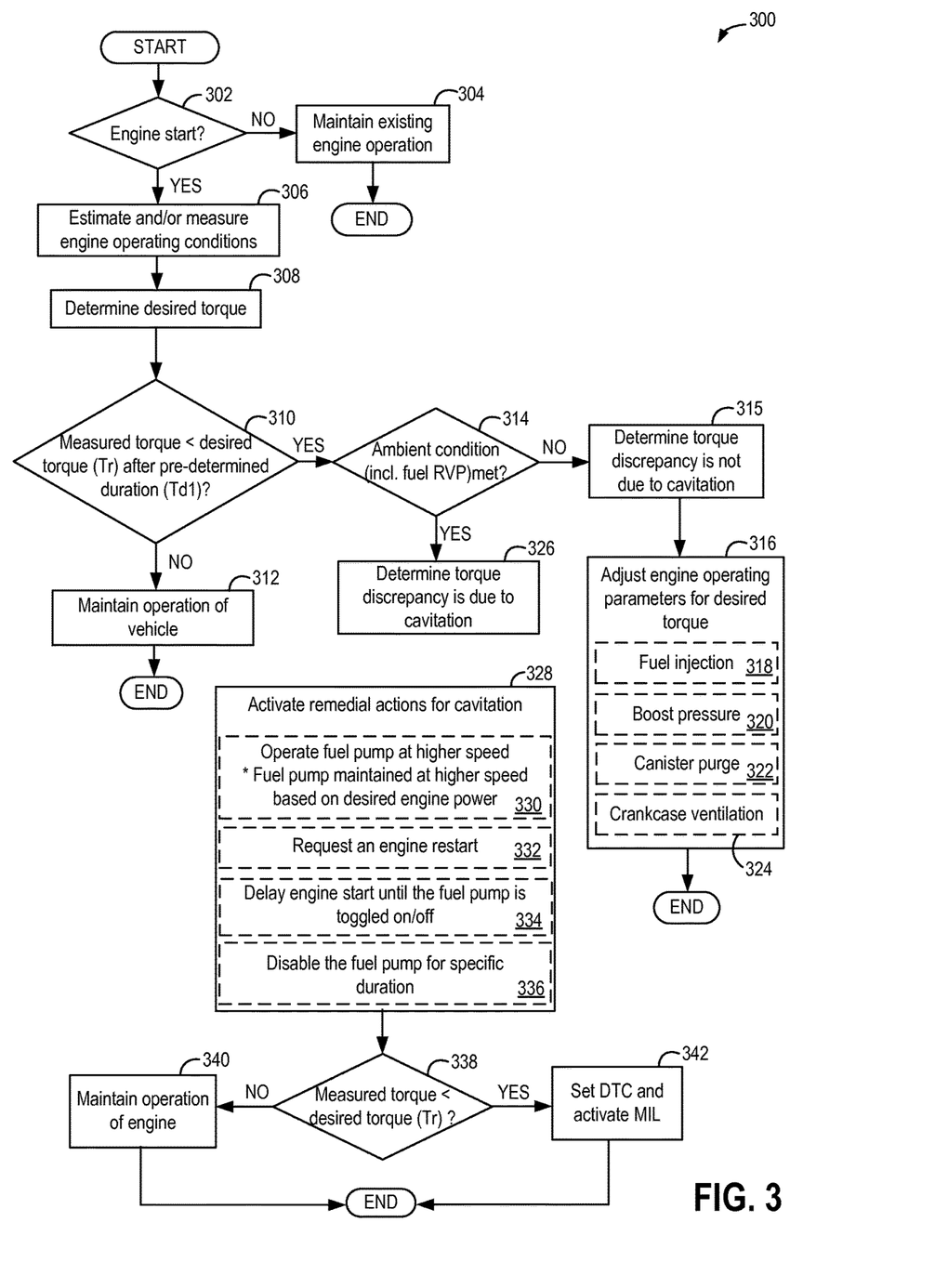
FIG. 3 depicts a high level flow chart for determining cavitation and adjusting engine and/or fuel pump operation responsive to the cavitation, according to the present disclosure.
Figure 4:
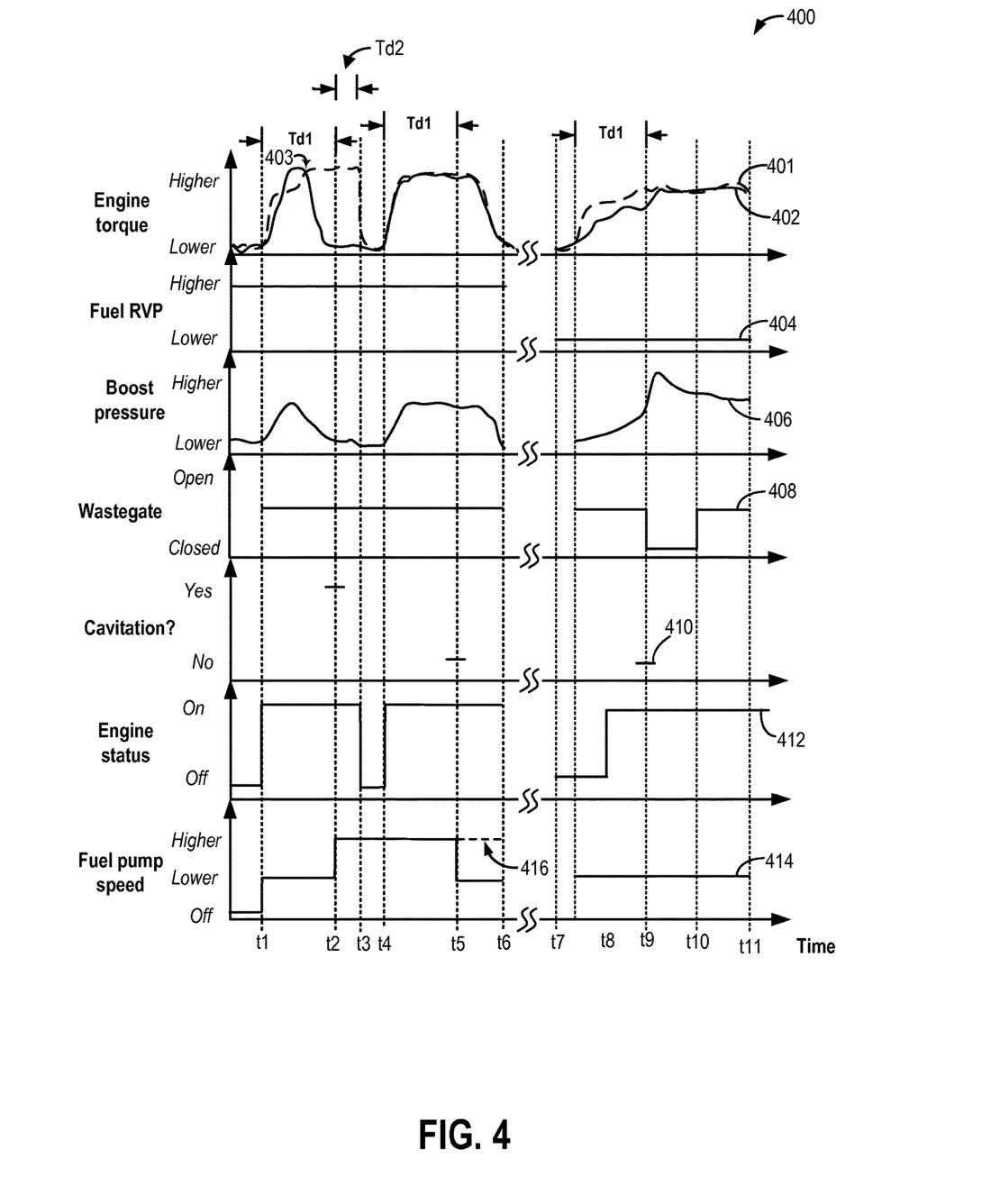
FIG. 4 shows example mitigating actions in response to loss of engine torque, in accordance with the present disclosure.

The following description relates to systems and methods for alleviating cavitation and resulting loss of engine torque in an engine, such as the example engine of FIG. 1. The engine may be included in a hybrid electric vehicle (HEV), such as the example HEV shown in FIG. 2. Alternatively, the engine may be included in a vehicle with a start-stop system. The engine in a HEV may be shut down and at rest for specific durations based on engine load and operator torque demand e.g., when a motor is propelling the HEV during lower engine loads. In a non-hybrid vehicle equipped with a start-stop system, the engine may be shut down and at rest when the vehicle is stopped at a traffic light, etc. A subsequent engine start may initiate combustion in the engine and generate engine torque. A controller in the vehicle may estimate the engine torque being produced. Further, ambient conditions such as ambient temperature, ambient pressure, etc. as well as fuel volatility may be recorded. The controller may determine that fuel cavitation is present based on existing ambient conditions and if the measured engine torque is lower than a desired engine torque after a specific duration since the engine start (FIG. 3). Accordingly, various mitigating actions may be initiated in response to the detection of cavitation. Further, these mitigating actions may be distinct from actions taken to alleviate torque loss when cavitation is not detected (FIG. 4).

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Engine 10, in one example, may be included in a hybrid electric vehicle (HEV). In another example, engine 10 may be included in a vehicle with a start-stop system wherein engine 10 may be shut down during certain engine conditions, e.g. idle, for improving fuel economy and reducing emissions.

Cylinder 14 (herein also termed combustion chamber 14) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system (not shown). Further, a starter motor (not shown) may be coupled to crankshaft 140 via a flywheel (not shown) to enable a starting operation of engine 10.

Cylinder 14 can receive intake air from intake manifold 144 via intake passage 142 and may exhaust combustion gases via exhaust manifold 148 and exhaust passage 158. Intake passage 142 and intake manifold 144 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged in intake air passage 142. Compressor 174 draws air from intake passage 142 to supply boost chamber 146. Boost pressure sensor 126 may be coupled to boost chamber 146 downstream of compressor 174 for providing signal "Boost" to controller 12.

Exhaust turbine 176 is arranged along exhaust passage 158. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A wastegate 168 may be coupled across exhaust turbine 176 in a turbocharger. Specifically, wastegate 168 may be included in a bypass passage 166 coupled between an inlet and outlet of the exhaust turbine 176. By adjusting a position of wastegate 168, an amount of boost provided by the exhaust turbine may be controlled.

A throttle 62 including a throttle plate 64 may be provided along an intake passage of the engine for varying the flow rate and/or pressure of intake air provided to the engine cylinders. For example, throttle 62 may be positioned downstream of compressor 174 as shown in FIG. 1, or alternatively may be provided upstream of compressor 174. Throttle 62 may control air flow from boost chamber 146 to intake manifold 144 and combustion chamber 14 (and other engine cylinders).

Exhaust manifold 148 can receive exhaust gases from other cylinders of engine 10 in addition to cylinder 14. Exhaust gas sensor 128 is shown coupled to exhaust passage 158 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. Ignition system 80 can provide an ignition spark to combustion chamber 14 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

Fuel injector 66 is shown arranged in intake manifold 144, rather than in cylinder 14, in a configuration that provides what is known as port injection of fuel (hereafter referred to as "PFI") into the intake port upstream of cylinder 14. Fuel injector 66 may inject fuel, received from fuel system 8, in proportion to the pulse width of signal FPW received from controller 12 via electronic driver 171. In some embodiments, combustion chamber 14 may alternatively or additionally include a fuel injector coupled directly to combustion chamber 14 for injecting fuel directly therein, in a manner known as direct injection.

Fuel system 8 includes a fuel tank 44 coupled to a fuel pump 21. Fuel tank 44 may store one or more liquid fuels, including but not limited to: gasoline, diesel, and alcohol fuels. In some examples, the fuel may be stored on-board the vehicle as a blend of two or more different fuels. Fuel tank 44 may include a fuel level sensor 46 which may comprise a float connected to a variable resistor for sending a signal regarding a fuel level in the tank to controller 12. The level of fuel stored in fuel tank 44 (e.g., as identified by the fuel level sensor) may be communicated to the vehicle operator, for example, via a fuel gauge or indication lamp (not shown) on a dashboard of the vehicle system.

Fuel tank 44 receives fuel via a refueling line 48, which acts as a passageway between the fuel tank 44 and a fuel door 62 on an outer body of the vehicle. Fuel may be pumped into the fuel tank 44 from fuel dispensing device 75. Fuel pump 21 is configured to pressurize fuel delivered to the injectors of engine 10, such as example fuel injector 66.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some embodiments, engine 10 may be configured for selective deactivation. For example, engine 10 may be selectively deactivatable responsive to idle-stop conditions. As such, the vehicle including engine 10 may be equipped with a start-stop system featuring selective engine deactivation during idle-stop conditions. Therein, responsive to any or all of idle-stop conditions being met, the engine may be selectively deactivated by deactivating cylinder fuel injectors. As such, idle-stop conditions may be considered met if the engine is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, the vehicle is at rest, and a driver requested torque or power demand is sufficiently low. In response to idle-stop conditions being met, the engine may be selectively and automatically deactivated via deactivation of fuel and spark. The engine may then start to spin to rest.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; boost pressure (Boost) from sensor 126 coupled to boost chamber 146; and absolute manifold pressure signal (MAP) from sensor 124. Engine speed signal, RPM, may be generated by controller 12 from signal PIP. During stoichiometric operation, Hall effect sensor 120 can give an indication of engine torque. In one example, sensor 120, which is also used as an engine speed sensor, produces a predetermined number of equally spaced pulses every revolution of the crankshaft. Manifold pressure signal MAP from a manifold pressure sensor may be used to provide an indication of vacuum, or pressure, in the intake manifold. Controller 12 may receive input data from the various sensors, process the input data, and trigger the actuators in response to the processed input data based on instruction or code programmed therein corresponding to one or more routines. An example control routine is described herein with regard to FIG. 3.

Figure 2:
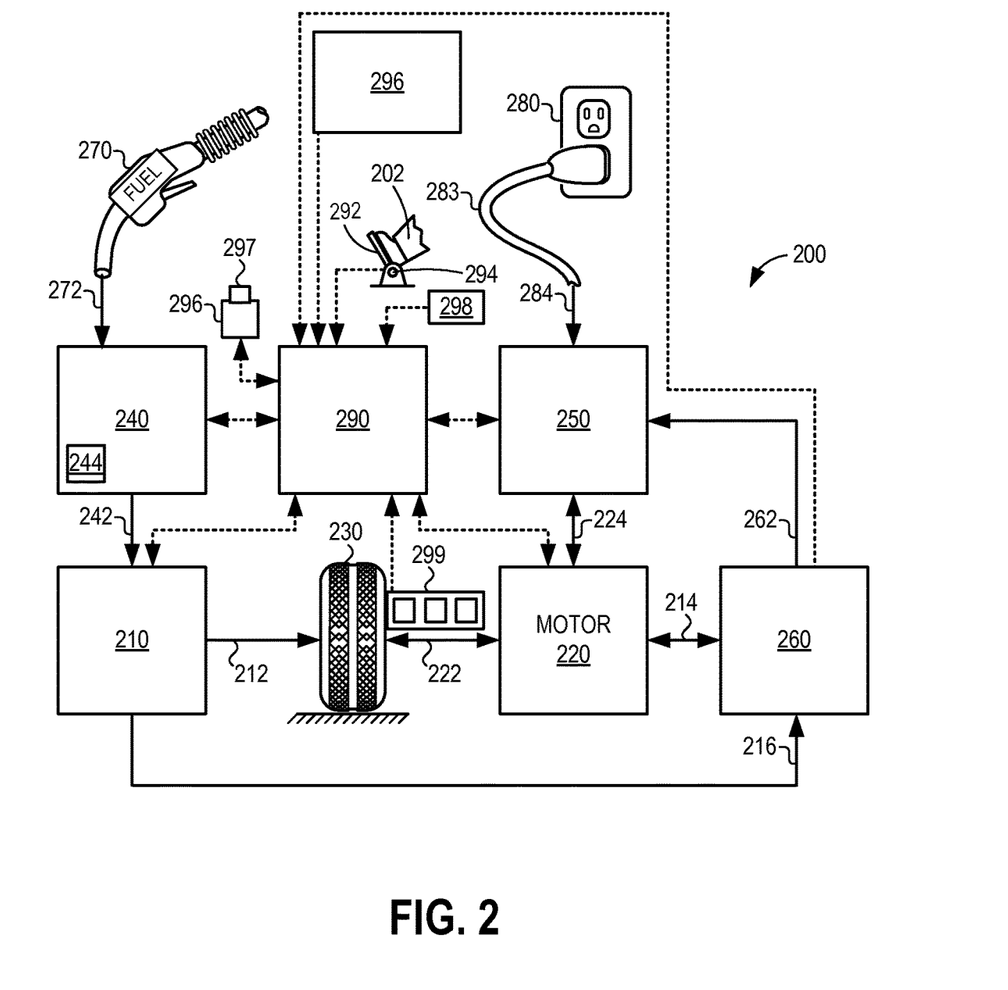
FIG. 2 illustrates a schematic layout of a hybrid electric vehicle (HEV).

FIG. 2 illustrates an example vehicle propulsion system 200. Vehicle propulsion system 200 includes a fuel burning engine 210 and a motor 220. Engine 210 may be the same as engine 10 of FIG. 1. As a non-limiting example, engine 210 comprises an internal combustion engine and motor 220 comprises an electric motor. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV). H (herein, also be termed a hybrid vehicle.

Vehicle propulsion system 200 may utilize a variety of different operational modes depending on operating conditions encountered by the vehicle propulsion system. Some of these modes may enable engine 210 to be maintained in an off state (i.e. set to a deactivated state) where combustion of fuel at the engine is discontinued. For example, under select operating conditions, motor 220 may propel the vehicle via drive wheel 230 as indicated by arrow 222 while engine 210 is deactivated.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some embodiments. However, in other embodiments, generator 260 may instead receive wheel torque from drive wheel 230, where the generator may convert the kinetic energy of the vehicle to electrical energy for storage at energy storage device 250 as indicated by arrow 262.

During still other operating conditions, engine 210 may be operated by combusting fuel received from fuel system 240 as indicated by arrow 242. Fuel system 240 may be the same as fuel system 8 described earlier in reference to FIG. 1. For example, engine 210 may be operated to propel the vehicle via drive wheel 230 as indicated by arrow 212 while motor 220 is deactivated. During other operating conditions, engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system. Note that in some embodiments, motor 220 may propel the vehicle via a first set of drive wheels and engine 210 may propel the vehicle via a second set of drive wheels.

In other embodiments, vehicle propulsion system 200 may be configured as a series type vehicle propulsion system, whereby the engine does not directly propel the drive wheels. Rather, engine 210 may be operated to power motor 220, which may in turn propel the vehicle via drive wheel 230 as indicated by arrow 222. For example, during select operating conditions, engine 210 may drive generator 260, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

Fuel system 240 may include one or more fuel tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of gasoline and ethanol (e.g., E10, E85, etc.) or a blend of gasoline and methanol (e.g., M10, M85, etc.), whereby these fuels or fuel blends may be delivered to engine 210 as indicated by arrow 242. Thus, liquid fuel may be supplied from fuel tank 244 to engine 210 of the motor vehicle shown in FIG. 1. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some embodiments, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors.

Control system 290 may communicate with one or more of engine 210, motor 220, fuel system 240, energy storage device 250, and generator 260. Control system 290 may be the same or similar to control system 28 of FIG. 1. As will be described by the process flow of FIG. 4, control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. Control system 290 may receive an indication of an operator requested output of the vehicle propulsion system from a vehicle operator 202. For example, control system 290 may receive sensory feedback from pedal position sensor 294, which communicates with pedal 292. Pedal 292 may refer schematically to a brake pedal and/or an accelerator pedal. In some examples, control system 290 may also receive sensory feedback regarding engine torque being produced. For example, a torque sensor may be used to provide feedback regarding engine torque.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnected between power source 280 and energy storage device 250. Control system 290 may identify and/or control the amount of electrical energy stored at the energy storage device, which may be referred to as the state of charge (SOC).

In other embodiments, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

In an alternative embodiment, the vehicle instrument panel 296 may communicate audio messages to the operator without display. Further, the sensor(s) 299 may include a vertical accelerometer to indicate road roughness. These devices may be connected to control system 290. In one example, the control system may adjust engine output and/or the wheel brakes to increase vehicle stability in response to sensor(s) 299.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some embodiments, fuel tank 244 may be configured to store the fuel received from fuel dispensing device 270 until it is supplied to engine 210 for combustion. In some embodiments, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

During vehicle operation, vapor bubbles may form in fuel system 240 reducing fuel pump performance and affecting fuel delivery to engine 210. The formation of vapor bubbles, termed cavitation, may produce engine hesitation, an unexpected loss of torque, and/or engine stall. However, loss of engine torque also may be caused by degradation of engine components such as an air-fuel ratio sensor, intake throttle, fuel injector, etc. Accordingly, one approach disclosed herein to detect torque loss due to cavitation may be based on a measured engine torque being less than a desired engine torque after a pre-determined duration following an engine start, and one or more ambient conditions, such as temperature, barometric (atmospheric) pressure, etc. Cavitation may also be determined based on inadequate engine torque and increased fuel volatility (e.g. a higher fuel Reid Vapor Pressure). Cavitation in the fuel system, namely the fuel pump, may be addressed by adjusting engine operation and/or fuel pump operation as will be described further in reference to FIG. 3 below.

Now turning to FIG. 3, an example routine 300 is provided for detecting cavitation in a fuel pump and adjusting engine operation and/or fuel pump operation to mitigate the cavitation. The engine and fuel pump may, in one example, be arranged within a hybrid electric vehicle. Alternatively, the engine and fuel pump may be positioned within a vehicle equipped with a start-stop system. Routine 300 may be carried out by a controller in the vehicle, such as controller 12. Instructions for carrying out this routine may be stored within non-transitory memory of the controller. Further, this routine may be executed by the controller.

At 302, routine 300 may determine if an engine start is occurring. For example, an engine in a hybrid vehicle may be deactivated and shut down when the hybrid vehicle is being chiefly propelled by a motor. Herein, an engine start may be desired in response to an increase in operator torque demand. In another example, an engine in a vehicle equipped with a start-stop system may be shut down and at rest during an idle condition such as when the vehicle is stopped at a traffic light. Accordingly, an engine start may occur when an accelerator pedal is depressed to initiate vehicle propulsion from rest. If it is determined that an engine start is not occurring, routine 300 may progress to 304 to maintain existing engine operation. For example, if the engine is shut down and at rest, the engine may be maintained shut down.

If, however, it is determined at 302 that an engine start is occurring, the routine continues to 306 to estimate and/or measure engine operating conditions. Engine operating conditions may include engine speed, engine load, catalyst temperature, pedal position, air-fuel ratio (AFR), etc. In addition, at 306, routine 300 may estimate ambient conditions such as existing ambient temperature and humidity, barometric pressure, etc. Further still, routine 300 may also estimate volatility of the fuel in the fuel tank (e.g., fuel Reid Vapor Pressure). In one example, fuel volatility may be based on fuel tank pressure and fuel temperature sensor measurements. In another example, fuel volatility may be inferred from a fuel alcohol content, as estimated based on the output of an exhaust gas oxygen sensor.

Next, at 308, a desired engine torque (Tr) may be determined. It will be noted that desired torque and desired engine torque may be used interchangeably in the description. The desired engine torque may be an operator demanded torque which can be modeled and/or calculated using measurements of one or more engine operating conditions, such as pedal position, tip-in and tip-out, and driver input via the pedal. As an example, the desired engine torque may be a higher torque during a tip-in event. Next, at 310, it may be determined if the measured engine torque (e.g., engine torque output) is lower than the desired engine torque after a pre-determined duration (Td1). The pre-determined duration for determining whether the measured engine torque is substantially equal to the desired engine torque following an engine start may also be termed a first pre-determined duration. In one example, the first pre-determined duration, Td1, may be a duration at which demanded torque may be achieved based on existing engine operating conditions. For example, the first pre-determined duration may be 2 minutes. In another example, the first pre-determined duration may be 30 seconds. Engine torque may be measured by a sensor, such as a crankshaft sensor and/or a cylinder pressure sensor. In an HEV, actual engine torque may be determined via a torque sensor.

If it is confirmed, at 310, that the measured engine torque is substantially equal to the desired torque (Tr) by the first pre-determined duration, Td1, routine 300 may continue to 312, wherein a desired operation of the engine and the vehicle is maintained. However, if it is confirmed at 310 that the measured engine torque is less than the desired torque, Tr, after completion of the first pre-determined duration, routine 300 may continue to 314 to determine if one or more ambient conditions are met. In one example, routine 300 may determine if a measured ambient temperature is higher than a temperature threshold. The temperature threshold may be based on fuel volatility and as such, may be a temperature at which fuel vaporization may increase. For example, the temperature threshold may be 90° F. In another example, the temperature threshold may be 100° F.

In another example, at 314, routine 300 may additionally or alternatively determine if a measured barometric pressure is lower than a threshold pressure. For example, the threshold pressure may be an atmospheric (barometric) pressure at which bubbles may form in fuel having a higher Reid Vapor Pressure (RVP), such as winter fuel. In another example, the threshold pressure may be an atmospheric pressure at which bubbles may form in a fuel having lower RVP (e.g., summer fuel) when an ambient temperature is above a threshold temperature. For example, the threshold pressure may be a pressure less than 80 kilopascals (kPa). In yet another example, at 314, routine 300 may additionally or alternatively determine if fuel volatility is higher than a threshold volatility (also termed volatility threshold), wherein the fuel volatility may be based on the fuel's RVP. As such, each of the temperature threshold, pressure threshold, and volatility threshold may vary based on one or more of the other ambient conditions. For example, the threshold temperature may depend on each of the measured barometric pressure and fuel volatility. Herein, a first temperature threshold may be higher if the measured barometric pressure is relatively higher and/or if fuel's RVP is relatively lower, as compared to a second temperature threshold when measured barometric pressure is relatively lower and/or the fuel volatility is relatively higher. Specifically, the temperature threshold may be different for a summer fuel (lower RVP) relative to that for a winter fuel (higher RVP).

If ambient conditions, including fuel volatility conditions, are not met at 314, routine 300 may determine at 315 that the observed torque discrepancy is not due to cavitation, and instead, may be the result of degradation in one or more engine components. For example, a degraded throttle that is stuck in a mostly closed or fully closed position may not allow sufficient intake airflow to the engine to produce the desired engine torque. In another example, the observed torque discrepancy may be a result of a clogged fuel injector. Accordingly, the routine progresses to 316 to adjust one or more engine operating parameters to mitigate the torque discrepancy.

For example, at 318, one or more of a fuel injection amount and fuel injection timing may be adjusted based on measured intake airflow and desired engine torque. At 320, boost pressure may be increased to increase aircharge within the engine in response to the measured torque being lower than the desired torque. Herein, a wastegate, such as wastegate 168 of FIG. 1, may be adjusted to a more closed position (from a more open position) such that exhaust gas from the exhaust manifold does not bypass the exhaust turbine. Specifically, a substantial amount of exhaust gas may be directed to the exhaust turbine (e.g., turbine 176). In another example, at 322, canister purge flow may be disabled in response to not detecting cavitation and when a richer than desired air-fuel ratio is prevalent in the engine. On the other hand, the canister purge flow may be enabled (or increased) in response determining that cavitation is not present and when a leaner than desired air-fuel ratio is measured in the engine. In yet another example, at 324, crankcase ventilation flow may be discontinued in response to not detecting cavitation and when a richer than desired air-fuel ratio exists in the engine. Alternatively, crankcase ventilation flow may be enabled (or increased) in response to determining that cavitation is absent and when a leaner than desired air-fuel ratio is estimated in the engine. In other embodiments, engine parameters other than those described above may be alternatively or additionally adjusted in response to not detecting cavitation without departing from the scope of this disclosure. For example, an intake valve timing may be adjusted to increase intake air into an associated cylinder. Specifically, a duration of intake valve opening may be increased. Routine 300 may then end.

Conversely, if one or more ambient conditions are met at 314, routine 300 may continue to 326 to determine that the observed torque discrepancy between the measured torque and the desired torque at 310 is due to cavitation in the fuel pump. It will be noted that cavitation may be confirmed at 326 based upon ambient conditions, including fuel volatility conditions, being met along with the measured engine torque being lower than the desired engine torque, Tr, after completion of the first pre-determined duration. As such, cavitation may not be confirmed by the presence of only one of the above conditions. To elaborate, as an example, cavitation may be determined when each of fuel volatility is greater than the volatility threshold, and the measured engine torque is lower than the desired engine torque, Tr, after completion of the first pre-determined duration. In another example, cavitation may be confirmed when each of ambient temperature is greater than the threshold temperature, and the measured engine torque is lower than the desired engine torque, Tr, after completion of the first pre-determined duration. In yet another example, cavitation may be determined when each of barometric pressure is lower than the threshold pressure, and the measured engine torque is lower than the desired engine torque, Tr, after completion of the first pre-determined duration.

In response to the cavitation, at 328, the controller may activate one or more remedial actions to mitigate cavitation in the fuel pump. For example, at 330, a fuel pump may be operated at a higher speed for a second pre-determined duration. In one example, after completion of the second pre-determined duration, the speed of the fuel pump may be reduced to a lower speed. As such, fuel pump speed may be decreased in response to measured engine torque being substantially equivalent to the desired engine torque. In another example, after the second pre-determined duration is completed, the speed of the fuel pump may be adjusted based on desired engine power. Herein engine power may be determined as a product of demanded torque and an engine speed.

Thus, an example method for an engine in a vehicle may comprise, following an engine start, determining cavitation in a fuel pump via a controller, and adjusting fuel pump operation in response to determination of cavitation, the adjusting including operating the fuel pump at a higher speed for a pre-determined duration, such as the second pre-determined duration described above. Engine operation may also be adjusted in response to determination of cavitation.

Returning to remedial actions to mitigate cavitation, at 332, an engine restart may be initiated. In yet another example, at 334, the fuel pump may be toggled on and off. Specifically, the fuel pump may be repeatedly activated and deactivated for a third pre-determined duration. Further, the engine may be shut down during the repetitive activation and deactivation of the fuel pump. In yet another example, at 336, the fuel pump may be disabled for a specific duration. Herein, the fuel pump may be deactivated and shut down for a fourth pre-determined duration. As such, if cavitation is not mitigated by the completion of the one of the aforementioned pre-determined duration, a different remedial action may be requested, such as one of the actions described earlier.

It will be appreciated that the first pre-determined duration, the second pre-determined duration, the third pre-determined duration, and the fourth pre-determined duration may be distinct and dissimilar from each other. In other examples, one or more of the first pre-determined duration, the second pre-determined duration, the third pre-determined duration, and the fourth pre-determined duration may be similar without departing from the scope of this disclosure.

It will also be appreciated that one or more of the remedial actions described at 328 may be executed alone or in combination with other remedial actions. For example, the controller may first operate the fuel pump at the higher speed, and re-evaluate the presence of cavitation. If cavitation is confirmed again, e.g. by measuring engine torque relative to desired engine torque after a time interval or count, such as the first pre-determined duration, Td1, the controller may request an engine restart while simultaneously and continuously operating the fuel pump at the higher speed until the cavitation is no longer confirmed. In another example, the controller may initiate an engine restart, followed by operation of the fuel pump at the higher speed without confirming the presence of cavitation after the engine restart. To elaborate, the engine may be restarted with the fuel pump operating at higher speed (instead of the fuel pump operating at lower speed during the engine restart), thus, using two remedial actions simultaneously. In yet another example, the controller may request a single remedial action such as delaying engine start until the fuel pump is operated at the higher speed for the second pre-determined duration. Further still, the controller may select one or more of the remedial actions based on operating conditions. For example, in an HEV, if a battery charge is lower than a threshold charge level, the fuel pump may not be activated to the higher speed and a different remedial action may be selected.

In yet another example, the controller may attempt one or more of the described remedial actions in any order until cavitation is mitigated. For example, though routine 300 describes the example of operating the fuel pump at the higher speed for the second pre-determined duration as a first remedial action, the controller may select the remedial action of repeatedly activating and deactivating the fuel pump as the first action in response to cavitation.

Next, at 338, after initiating one or more of the remedial actions for cavitation, it may be determined if the measured engine torque remains lower than the demanded engine torque, Tr. As such, the controller may determine if the measured engine torque is substantially equal to Tr by the first pre-determined duration, Td1. As explained earlier, the first pre-determined duration, Td1, may be a duration after which demanded torque may be achieved based on existing engine operating conditions. If, at 338, the measured engine torque substantially equivalent to the desired engine torque (Tr), routine 300 proceeds to 340 where the controller may maintain operation of the engine at the desired torque. Further, if the speed of the fuel pump has been increased to remedy cavitation, fuel pump speed may be returned to a lower speed. In some examples, the fuel pump may remain at the higher speed even after cavitation is no longer detected. The higher speed of the fuel pump may be based on desired engine power.

However, if the measured engine torque is determined to be lower than the desired torque (Tr) at 338, routine 300 proceeds to 342, wherein a diagnostic trouble code (DTC)

may be set, and/or a malfunction indicator lamp (MIL) may be activated to inform the vehicle operator of the torque discrepancy.

As such, routine 300 illustrated in FIG. 3 may enable effective detection and mitigation of torque discrepancy caused by cavitation in some embodiments. Thus, an example method for an engine in a vehicle may comprise, following an engine start, adjusting engine operation or fuel pump operation responsive to detection of cavitation in a fuel pump, the detection of cavitation based on ambient conditions and a measured engine torque being lower than a desired engine torque after a first pre-determined duration. As such, one or more of engine operation and fuel pump operation may be adjusted in response to the detection of cavitation in the fuel pump. Further, in some examples, the fuel pump may be a lower pressure fuel pump, and the vehicle may be a hybrid vehicle. The detection of cavitation may be based on ambient conditions including determining cavitation based on one or more of ambient temperature being higher than a temperature threshold, barometric pressure lower than a threshold pressure, and fuel volatility higher than a threshold volatility. The detection of cavitation may be based on ambient conditions being met, as well as the measured engine torque being less than the desired engine torque after the first pre-determined duration.

As such, adjusting fuel pump operation may include one or more of activating and deactivating the fuel pump repeatedly for a second pre-determined duration, deactivating the fuel pump for a third pre-determined duration, and operating the fuel pump at a higher speed for a fourth pre-determined duration. Further, adjusting the engine operation may include one or more of commanding an engine restart and delaying engine start until the fuel pump is operated at the higher speed for the fourth pre-determined duration. Further, following the fourth pre-determined duration, the controller may adjust the speed of the fuel pump based on a desired engine power.

The example method may also comprise adjusting an engine operating parameter in response to not detecting vapor cavitation. For example, the engine operating parameter may include boost pressure, and upon determination of no cavitation, boost pressure may be increased. In another example, the engine operating parameter may include crankcase ventilation flow, and upon determination of no cavitation, crankcase ventilation flow may discontinue in response to a richer than desired air-fuel ratio in the engine, or crankcase ventilation flow may be enabled in response to a leaner than desired air-fuel ratio in the engine. In yet another example, the engine operating parameter may include canister purge flow, and upon determination of no cavitation, canister purge flow may be disabled in response to a richer than desired air-fuel ratio in the engine, or enabled in response to a leaner than desired air-fuel ratio in the engine. Moreover, upon determination of no cavitation in the fuel pump, the controller may adjust one or more of a fuel injection amount and fuel injection timing based on measured intake airflow and desired engine torque. In this way, the systems and methods described herein may enable effective reduction or elimination of torque discrepancies caused by cavitation in a fuel pump. Further, the systems and methods may allow remediation of torque discrepancies not caused by cavitation in the fuel pump via adjustments to other engine parameters.

FIG. 4 includes graph 400 illustrating example adjustments to one or more of engine operation and fuel pump operation responsive to detection of cavitation in a fuel pump in an HEV. Further, the HEV may be a boosted vehicle. In another example, the engine and the fuel pump may be included in a vehicle equipped with a start-stop system. Additionally, graph 400 includes an example adjustment to an engine parameter when cavitation in the fuel pump may not be present and inadequate engine torque may be caused by degradation of one or more engine components. Specifically, graph 400 shows changes in desired engine torque at plot 401 (dashed line), changes in measured engine torque at plot 402, fuel RVP at plot 404, changes in boost pressure at plot 406, changes in wastegate position at plot 408, detection of cavitation at plot 410, changes in engine status at plot 412, and changes in fuel pump speed at plot 414. As such, the engine status may be "ON" when the engine is combusting and spinning to power the vehicle. The engine status may be "OFF" when the engine is not combusting, and is shut down and at rest. The wastegate position may vary between fully opened (depicted as "Open"), fully closed (depicted as "Closed"), and an intermediate position between fully opened and fully closed. The fuel pump speed may vary between deactivated (or OFF), a higher pump speed, and a lower pump speed. Time is plotted along the x-axis, and time increases from the left of the x-axis to the right. Further, an operator demanded torque (e.g., desired engine torque Tr) is represented by line 401.

Prior to time t1, the engine is "OFF", and no engine torque or boost pressure are produced. For example, the vehicle may be propelled by a motor in the HEV. In the alternative example of the vehicle equipped with the start-stop system, the engine may be shut down and at rest when the vehicle is stopped at a traffic stop light. In addition, between time t1 and t6, the fuel may be confirmed as winter fuel having a higher RVP than summer fuel.

At time t1, the engine is activated and may begin combusting. For example, the engine may be activated when the HEV is cruising on a highway. In another example of the vehicle with the start-stop system, the engine is activated when the idle condition is terminated such as when the accelerator pedal is depressed. Consequently, an increase in measured engine torque may occur (as shown by plot 402), closely following desired engine torque depicted as plot 401. As such, the engine start may be a hot start and not a cold start. Boost pressure may gradually increase between time t1 and t2, and level off as the wastegate is maintained between fully open and fully closed positions. Further, as the engine is activated at time t1, the fuel pump may be simultaneously activated to a lower speed setting. The engine may operate as described for a first pre-determined duration, denoted here as Td1 (in the depicted example, a duration between time t1 and time t2). In one example, the first pre-determined duration Td1 may be a duration in which the measured engine torque may be expected to reach a desired torque level depending on prevalent engine operating conditions. In this way, the first pre-determined duration, Td1, may represent a duration in which the desired torque may be achieved.

Between time t1 and time t2, measured engine torque initially increases and meets desired engine torque, Tr at 403). However, after 403, measured engine torque decreases rapidly relative to desired torque. At time t2, upon completion of the first pre-determined duration (Td1), the measured engine torque is substantially less than the desired torque, Tr (plot 401). One example source of the torque discrepancy between the measured engine torque and the desired engine torque (Tr) may be cavitation in a fuel pump in the vehicle. Accordingly, a controller, such as controller 12 of FIG. 1 or control system 290 of FIG. 2 may confirm if particular ambient conditions are prevalent. Since fuel volatility is higher, as depicted by higher RVP of the fuel, cavitation may be determined as the cause of the torque discrepancy at time t2. Although not shown, ambient temperature in this example may be higher than a temperature threshold such that vapor bubbles may form in the fuel pump. It will be noted that fuel volatility may also be higher if barometric pressure is lower. In alternative examples, different ambient conditions from those discussed above may be confirmed to detect the presence of cavitation.

In response to the detection of cavitation at time t2 (plot 410), one or more mitigating actions may be initiated, as described in reference to FIG. 3. In the depicted example, a fuel pump, such as fuel pump 21 of FIG. 1, may be operated at a higher speed for a second pre-determined duration, Td2, between time t2 and t3. The engine may be maintained "ON" between time t2 and time t3 to wait for mitigation of cavitation via the higher speed of the fuel pump. However, at time t3, measured engine torque remains substantially lower than the desired torque and the engine may be shut down to rest at time t3. Therefore, between time t3 and time t4, the engine may be "OFF".

The fuel pump may continue to operate at the higher speed from time t2 onwards and through time t4. After a period of engine "OFF", the engine may be restarted. As shown by plot 412, the engine is activated at time t4. The fuel pump may continue to operate at the higher speed at time t4. Further, as shown by plots 401 and 402, measured engine torque rises upon engine restart at time t4 and achieves the desired engine torque. The engine may operate between time t4 and time t5 for the first pre-determined duration, Td1, as described above.

At time t5, the measured engine torque is substantially similar to the desired torque, Tr, indicating that the remedial actions of operating the fuel pump at the higher speed between time t2 and time t5 and/or the engine restart at time t4 eliminated cavitation. Thus, at time t5, it is confirmed that the aforementioned remedial actions of operating the fuel pump at the higher speed and restarting the engine mitigated cavitation. Accordingly, in response to no detection of cavitation (plot 410), the fuel pump speed may be returned to the lower speed setting at time t5 (plot 414), and may operate at the lower speed between time t5 and time t6. Alternatively, if higher engine speed and/or engine torque are demanded, the fuel pump may be maintained at the higher speed to achieve desired engine power, as illustrated by dashed line 416.

Between time t5 and time t6, the engine is producing sufficient torque to meet operator demand. At time t6, a vehicle drive cycle comprising all events between time t1 and time t6 ends.

In alternative examples, if the aforementioned increase in fuel pump speed does not provide the desired engine torque, additional or alternative adjustments to engine operation and/or pump operation, in combination or alone, may be performed. For example, adjustments may include activating and deactivating the fuel pump repeatedly for a third pre-determined duration, and deactivating the fuel pump for a fourth pre-determined duration.

Between time t6 and time t7, a duration may pass wherein one or more vehicle cycles may have occurred. In contrast to the vehicle cycle between time t1 and time t6, the fuel's RVP may be lower at t7 (e.g., the fuel may be changed from a winter fuel to a summer fuel in summer). Specifically, the RVP of the fuel in the vehicle drive cycle between time t7 and time t11 is lower.

At time t7, the engine is "OFF" and shut down to rest. As described earlier, the engine may be shut down when the HEV is propelled primarily by the motor. In the example of the vehicle equipped with the start-stop system, the engine may be deactivated to "OFF" during idle-stop conditions. Accordingly, engine torque may not be produced at time t7 and boost pressure may not be available. Further, the fuel pump is not active and may be disabled at time t7.

At time t8, the engine is activated and the engine status may be "ON" such that the engine may begin combusting and producing engine torque. For example, the engine may be activated when operator demanded torque rises sharply. As such, the engine start may be an engine hot start. Boost pressure may gradually increase between time t8 and time t9 as the wastegate is at a position intermediate to fully open and fully closed positions. Further, as the engine is activated, the fuel pump may be simultaneously activated at time t8 to a lower speed setting. The vehicle may operate as described for the first pre-determined duration, denoted here as Td1 (i.e. in this example, a duration between time t8 and time t9). In one example, the first pre-determined duration Td1 may be same as the pre-determined duration between time t1 and time t2, and between time t3 and time t4. The pre-determined duration Td1 may depend on engine operating conditions. As such, the pre-determined duration Td1 may represent a duration in which engine torque output may be expected to meet the demanded torque.

At time t9 upon completion of the first pre-determined duration, however, the measured engine torque remains considerably lower than the desired torque, Tr (line 401). One example source of the torque discrepancy between the measured engine torque and the desired engine torque, Tr, may be cavitation in the fuel pump. Thus, particular ambient conditions, such as those described in reference to FIG. 3, may be confirmed by a controller, such as controller 12. In this example, the fuel RVP may be confirmed to be lower (e.g., summer fuel) as compared to higher RVP winter fuel at time t1 to t6. Thus, fuel volatility may be lower indicating that cavitation in the fuel pump may not be the source of the torque discrepancy. Although not shown, ambient temperature in this example may also be lower than the threshold temperature such that cavitation is not likely in the fuel pump. Thus, cavitation in the fuel pump may not be confirmed (plot 410) at time t9 since the RVP of the fuel is lower. In alternative examples, other ambient conditions may be confirmed to detect lack of cavitation.

Accordingly, it may be confirmed at time t9 that the torque discrepancy is not due to cavitation, but may be due to degradation in one or more engine components. In one example, the torque discrepancy may be caused at least in part by reduced airflow into the intake manifold. The reduced airflow may be due to a throttle stuck in a more closed position as determined by a throttle position sensor. In another example, inadequate torque may be due to a clogged fuel injector such that insufficient amount of fuel is delivered into the engine.

In order to reduce the torque discrepancy and provide the desired engine torque, Tr, an amount of airflow into the intake manifold may be increased. For example, adjustments to one or more engine parameters may be executed. In one example, a wastegate, such as wastegate 168 of FIG. 1, may be adjusted to a more closed position to increase boost. As such, the wastegate may be adjusted to the more closed position from a more open position. In another example, a duration of intake valve opening may be increased. In yet another example, an amount of fuel injected into the engine cylinder may be increased by adjusting the pulse width of one or more fuel injector(s).

At time t9, the wastegate may be moved to the fully closed position from a position between fully open and fully closed. By fully closing the wastegate, a considerable portion of exhaust gases exiting the engine cylinders may be directed to the turbine of the turbocharger, thereby increasing boost pressure rapidly at time t9. In response to the increase in boost pressure, measured engine torque may increase after time t9. At time t10, the measured engine torque is substantially equal to the desired engine torque (line 401). Accordingly, the wastegate is adjusted from the fully closed position to a position between fully open and fully closed. Alternatively, the position of the wastegate may be adjusted to a distinct position based on engine operating conditions. Between time t10 and time t11, the measured engine torque is substantially at the desired torque level. At time t11, the vehicle drive cycle comprising all events between time t7 and time t11 ends.

It will be appreciated that if the aforementioned adjustment to the wastegate, and boost pressure, does not produce the desired engine torque, additional or alternative adjustments to one or more engine parameters in combination or alone, may be performed. These adjustments may be performed upon confirming that the torque discrepancy is not due to cavitation in the fuel pump. For example, crankcase ventilation flow may be discontinued when a richer than desired air-fuel ratio is determined in the engine. By reducing crankcase ventilation, a desired air-fuel ration may be maintained. Alternatively, crankcase ventilation flow may be enabled and/or increased in response to a leaner than desired air-fuel ratio existing in the engine. As such, increasing crankcase ventilation flow may provide additional airflow, including fuel vapors as blow-by gases from the crankcase, into the intake manifold. In yet another example, canister purge flow may be disabled when a richer than desired air-fuel ratio in the engine. By reducing canister purge flow, the engine may operate with the desired air-fuel ratio. On the other hand, the canister purge flow may be enabled and/or increased in response to detecting a leaner than desired air-fuel ratio in the engine. Herein, the increased canister purge flow may provide airflow and fuel vapors into the intake manifold. In still another example, an amount of fuel injected in one or more engine cylinders may be modified. In a fourth example, a timing of fuel injection may be adjusted based on measured intake airflow and desired engine torque. In yet another example, other engine parameters, such as valve timing, may be alternatively or additionally adjusted in response to inadequate engine torque.

Thus, remedial actions in response to determining loss of engine torque due to cavitation in the fuel pump may be distinct and dissimilar from those applied when loss of engine torque is not due to cavitation.

In this manner, a system for a hybrid vehicle may be provided to detect and mitigate cavitation, comprising an engine including an intake, the intake including a throttle, a generator coupled to a battery, vehicle wheels propelled using torque from one or more of the engine and the generator, an engine cylinder including a port fuel injector, an intake valve, and an exhaust valve, a fuel system having a lower pressure fuel pump for providing fuel to the port fuel injector, a boost device including a compressor and a turbine, the compressor coupled to the intake upstream of the throttle, and a wastegate coupled across the turbine. In addition, the system may comprise a controller having executable instructions stored in a non-transitory memory for: during a first engine restart condition, adjusting a speed of the fuel pump in response to a measured engine torque being lower than a desired engine torque after a first pre-determined duration; and during a second engine restart condition, adjusting one or more engine parameters in response to the measured engine torque being lower than the desired engine torque after the first pre-determined duration.

In one example, the first engine restart condition may include detection of fuel cavitation in the fuel pump. In another example, the second engine restart condition may include not detecting fuel cavitation in the fuel pump. Moreover, detection of fuel cavitation in the fuel pump may be based on the measured engine torque being lower than the desired engine torque after the first pre-determined duration and one or more of ambient temperature higher than a temperature threshold, barometric pressure lower than a threshold pressure, and fuel volatility higher than a threshold volatility.

The controller may include further instructions for, during the first engine restart condition, adjusting the speed of the fuel pump from a lower speed to a higher speed, and maintaining the speed of the fuel pump at the higher speed for a second pre-determined condition. The controller may include additional instructions for, following the second pre-determined duration, adjusting the speed of the fuel pump based on a desired engine power. Further still, the controller may also include instructions for, during the second engine restart condition, adjusting one or more of crankcase ventilation flow, boost pressure, canister purge flow, a duration of intake valve opening, an amount of fuel injected into the engine cylinder, and a timing of fuel injection.

The technical effect of adjusting fuel pump operation and engine operation upon detection of cavitation in a fuel pump may include an alleviation of adverse effects of cavitation on engine operation. In one example, detection of cavitation is based on a measured torque being lower than a desired engine torque after a first pre-determined duration and ambient conditions. By determining that a loss of engine torque following an engine start is due to cavitation, various actions specific to mitigating cavitation may be performed. Accordingly, potential issues of cavitation such as engine hesitation, engine stall, and loss of engine torque may be reduced. Overall, engine performance may be enhanced and operator driving experience may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:
following an engine start as determined by an electronic controller,
adjusting engine operation or fuel pump operation via the controller responsive to detection of cavitation in a fuel pump, the detection of cavitation based on each of ambient conditions and a measured engine torque being lower than a desired engine torque after a first pre-determined duration as determined by the controller.

2. The method of claim 1, wherein detection of cavitation based on ambient conditions includes determining cavitation based on one or more of ambient temperature higher than a temperature threshold, barometric pressure lower than a threshold pressure, and fuel volatility higher than a threshold volatility.

3. The method of claim 2, wherein adjusting fuel pump operation includes one or more of activating and deactivating the fuel pump repeatedly for a second pre-determined duration, deactivating the fuel pump for a third pre-determined duration, and operating the fuel pump at a higher speed for a fourth pre-determined duration.

4. The method of claim 3, wherein adjusting the engine operation includes one or more of commanding an engine restart and delaying engine start until the fuel pump is operated at the higher speed for the fourth pre-determined duration.

5. The method of claim 4, further comprising adjusting an engine operating parameter in response to not detecting cavitation.

6. The method of claim 5, wherein the engine operating parameter includes boost pressure, and wherein the adjusting includes increasing the boost pressure.

7. The method of claim 5, wherein the engine operating parameter includes crankcase ventilation flow, and wherein the adjusting includes discontinuing crankcase ventilation flow in response to a richer than desired air-fuel ratio in the engine.

8. The method of claim 7, wherein the adjusting includes enabling crankcase ventilation flow in response to a leaner than desired air-fuel ratio in the engine.

9. The method of claim 5, wherein the engine operating parameter includes canister purge flow, and wherein the adjusting includes disabling the canister purge flow in response to a richer than desired air-fuel ratio in the engine.

10. The method of claim 9, wherein the adjusting includes enabling canister purge flow in response to a leaner than desired air-fuel ratio in the engine.

11. The method of claim 5, further comprising adjusting one or more of a fuel injection amount and a fuel injection timing based on measured intake airflow and desired engine torque.

12. A system for a hybrid vehicle, comprising:
an engine including an intake, the intake including a throttle;
a generator coupled to a battery;
vehicle wheels propelled using torque from one or more of the engine and the generator;
an engine cylinder including a port fuel injector, an intake valve, and an exhaust valve;
a fuel system including a fuel pump for providing fuel to the port fuel injector;
a boost device including a compressor and a turbine, the compressor coupled to the intake upstream of the throttle;
a wastegate coupled across the turbine; and
a controller having executable instructions stored in a non-transitory memory for:
during a first engine restart condition,
adjusting a speed of the fuel pump in response to a measured engine torque being lower than a desired engine torque after a first pre-determined duration; and
during a second engine restart condition,
adjusting one or more engine parameters in response to the measured engine torque being lower than the desired engine torque after the first pre-determined duration.

13. The system of claim 12, wherein the first engine restart condition includes detection of fuel cavitation in the fuel pump, and wherein the second engine restart condition includes not detecting fuel cavitation in the fuel pump.

14. The system of claim 13, wherein detection of fuel cavitation in the fuel pump is based on the measured engine torque being lower than the desired engine torque after the first pre-determined duration and one or more of ambient temperature higher than a temperature threshold, barometric pressure lower than a threshold pressure, and fuel volatility higher than a threshold volatility.

15. The system of claim 14, wherein the controller includes further instructions for, during the first engine restart condition, adjusting the speed of the fuel pump from a lower speed to a higher speed, and maintaining the speed of the fuel pump at the higher speed for a second pre-determined duration.

16. The system of claim 15, wherein the controller includes further instructions for, following the second pre-determined duration, adjusting the speed of the fuel pump based on a desired engine power.

17. The system of claim 16, wherein the controller includes further instructions for, during the second engine restart condition, adjusting one or more of crankcase ventilation flow, boost pressure, canister purge flow, a duration of intake valve opening, an amount of fuel injected into the engine cylinder, and a timing of fuel injection.

18. A method for an engine in a vehicle, comprising:
following an engine start,
   determining cavitation in a fuel pump via a controller; and
   adjusting fuel pump operation in response to determination of cavitation, the adjusting including operating the fuel pump at a higher speed for a first pre-determined duration.

19. The method of claim 18, wherein determining cavitation in the fuel pump is based on each of a measured engine torque being lower than a desired torque after a second pre-determined duration, and one or more of ambient temperature being higher than a temperature threshold, barometric pressure lower than a threshold pressure, and fuel volatility higher than a threshold volatility.

20. The method of claim 18, further comprising, if cavitation in the fuel pump is not determined, adjusting one or more engine parameters, the engine parameters including crankcase ventilation flow, boost pressure, canister purge flow, intake valve opening, fuel injection amount, and fuel injection timing.

* * * * *